US012240230B2

(12) United States Patent
Peinado Gutierrez et al.

(10) Patent No.: US 12,240,230 B2
(45) Date of Patent: Mar. 4, 2025

(54) FLUIDIC DIES

(71) Applicant: Hewlett-Packard Development Company, L.P., Spring, TX (US)

(72) Inventors: David Peinado Gutierrez, Sant Cugat del Valles (ES); Ferran Olivera Corpas, Sant Cugat del Valles (ES); David Vendrell Tornero, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 178 days.

(21) Appl. No.: 18/246,597

(22) PCT Filed: Sep. 25, 2020

(86) PCT No.: PCT/US2020/052932
§ 371 (c)(1),
(2) Date: Mar. 24, 2023

(87) PCT Pub. No.: WO2022/066174
PCT Pub. Date: Mar. 31, 2022

(65) Prior Publication Data
US 2023/0391071 A1 Dec. 7, 2023

(51) Int. Cl.
*B41J 2/045* (2006.01)

(52) U.S. Cl.
CPC ....... *B41J 2/04505* (2013.01); *B41J 2/04586* (2013.01)

(58) Field of Classification Search
CPC ........................ B41J 2/04505; B41J 2/04586; B41J 2202/21; B41J 2/04573; B41J 2/155; B41J 2/2132; B41J 2202/20
See application file for complete search history.

(56) References Cited

U.S. PATENT DOCUMENTS

| | | | |
|---|---|---|---|
| 5,534,895 A | 7/1996 | Lindenfelser et al. | |
| 6,588,872 B2 | 7/2003 | Anderson et al. | |
| 10,035,366 B2 | 7/2018 | Quintero Ruiz et al. | |
| 10,160,198 B2 | 12/2018 | Casaldaliga Albisu et al. | |
| 10,377,160 B2 | 8/2019 | Liu et al. | |
| 10,532,559 B2 | 1/2020 | Quintero Ruiz et al. | |
| 2009/0261499 A1 | 10/2009 | Maier et al. | |
| 2015/0158291 A1* | 6/2015 | Suzuki ....................... | B41J 2/51 347/12 |
| 2016/0009082 A1 | 1/2016 | Chen et al. | |
| 2017/0126931 A1 | 5/2017 | Morovic et al. | |

FOREIGN PATENT DOCUMENTS

WO 2017/184167 A1 10/2017

* cited by examiner

*Primary Examiner* — Thinh H Nguyen
(74) *Attorney, Agent, or Firm* — Jordan IP Law, LLC

(57) ABSTRACT

In an example a method comprises operating, by a processor, on a first quantity that is proportional to a side of a parallelogram printed, at least in part, on a substrate by a fluidic die, the side of the parallelogram being substantially perpendicular to the direction of advancement of the substrate. The method further comprises operating, by a processor, on a second quantity and a third quantity, the second and third quantities respectively being proportional to the length of the lines bisecting the parallelogram. The method comprises calculating, by a processor, an angle that the fluidic die makes with the direction of advancement of the substrate based on the first, second, and third quantities.

15 Claims, 8 Drawing Sheets

FLUIDIC DIES

BACKGROUND

Example fluidic dies, which may be part of a printhead assembly of a print apparatus, may be caused to print an image, e.g. via the discharge of printing fluid from a nozzle thereof, onto a substrate.

BRIEF DESCRIPTION OF DRAWINGS

Examples will now be described, by way of non-limiting example, with reference to the accompanying drawings, in which.

DETAILED DESCRIPTION

In some printers there is an angle between a fluidic die that is to print at least part of an image to a substrate (or print media) and the substrate. If this is the case, then that angle, if not calibrated for, can be translated into image quality defects such as geometrical errors in the printed images, or bad margin registration. For example, if a fluidic die is instructed to print at least part of a rectangle onto a substrate (e.g. a printbar comprising a number of fluidic dies is instructed to print a rectangle to a substrate), and if the die (e.g. the printbar) is angled with respect to that substrate, then the printed image may be misaligned into a non-squared parallelogram instead of a rectangle (as instructed). These defects may be magnified if printing double-sided.

Some examples herein relate to determining the angle between a fluidic die and a substrate based on three quantities that may be derived from a printed parallelogram on that substrate. Where there is no misalignment between the die and the substrate then the printed parallelogram would be substantially a rectangle (as the die was instructed to print) these quantities may lead to an angle being derived that is substantially 0 or 180 degrees. However, where there is misalignment between the die and the substrate then the printed parallelogram would comprise a non-squared parallelogram and these quantities may lead to an angle being derived that is between 0 and 90 degrees.

Figure 1:
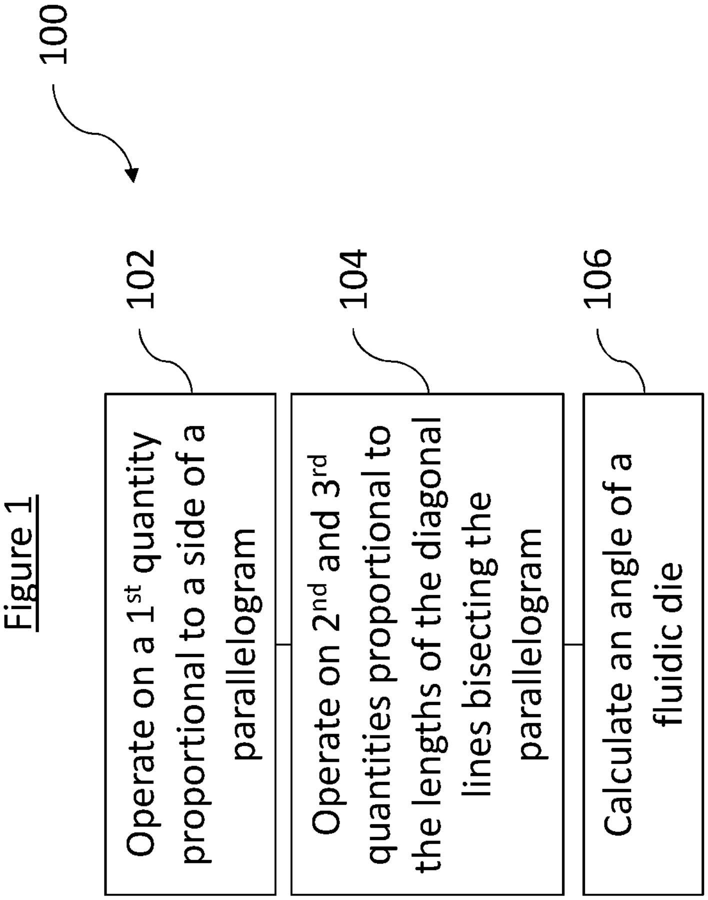
FIG. 1 is a flowchart of an example of a method.

FIG. 1 shows an example method 100. The method 100 may comprise a computer-implemented method. The method 100 may comprise a method of calculating an angle of a fluidic die. For example, the method 100 may comprise a method of calculating the angle that a fluidic die makes with a substrate (for example, relative or with respect to a direction of advancement of the substrate, which may also be termed a longitudinal direction, or in a direction perpendicular to the direction of advancement of the substrate, which may also be termed a cross web or transverse direction).

The method 100 comprises, at block 102, operating, by a processor, on a first quantity. The first quantity is proportional to a side of a parallelogram that is printed, at least in part, on a print media (or substrate) by a fluidic die, the side of the parallelogram (that the first quantity is proportional to) is substantially perpendicular to the direction of advancement of the print media.

The method 100 comprises, at block 104, operating, by a processor, on a second quantity and on a third quantity. The second and third quantities are respectively proportional to the lengths of the diagonal lines that bisect the parallelogram.

The method 100 comprises, at block 106, calculating, by a processor, the angle of the fluidic die relative to the print media based on the first, second, and third quantities.

The angle, calculated at block 106, may comprise an angle that the fluidic die (for example a length thereof, or a direction of a nozzle array thereof, etc.) makes with the direction of advancement of the print media, or with a transverse, or crossweb, direction of the print media. At block 106, the calculated angle may comprise one of the aforementioned angles directly or, in other examples, may be an angle proportional to one of those aforementioned angles (and in that way the angle, calculated at block 106, may enable a further angle to be determined, e.g. by a processor).

Figure 3A:
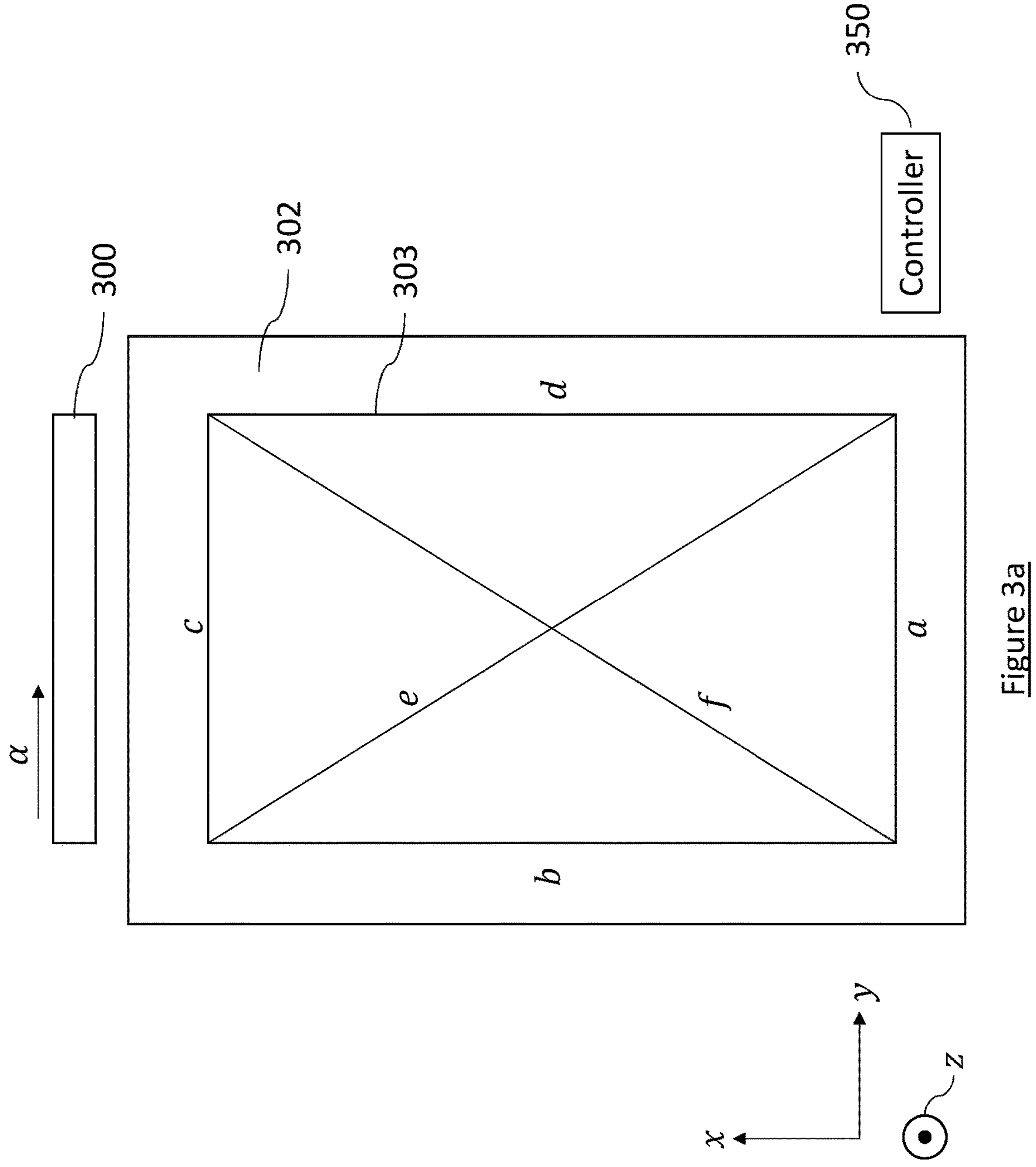
FIGS. 3*a*-3*c* are schematic examples of a fluidic die and substrate.

FIG. 3*a* shows a fluidic die 300 and a substrate 302. In this example, the die 300 is correctly positioned relative to the substrate 302 for a print operation in that the length L of the die (for example a nozzle array or row of nozzles thereof) is perpendicular to the direction X of advancement of the substrate and parallel to the transverse, or crossweb, direction Y of the substrate. Put another way, in the FIG. 3*a* example, the die 300 makes an angle of substantially 90 degrees with the direction X of advancement of the substrate and makes an angle of substantially 0 or 180 degrees with the crossweb direction Y.

The fluidic die 300 may be a part of a printbar, the printbar comprising a number of fluidic dies 300. For example the fluidic die 300 may be part of a printhead and a printbar may comprise a number of printheads. The fluidic die 300 may comprise a nozzle array, or a number of nozzles arranged in a row, and the length L of the die may be parallel to the nozzle array (or the direction of the nozzle array, for example the direction in which the nozzle array extends in the die).

In the example of FIG. 3*a*, the fluidic die 300 has been instructed, e.g. during the course of a print operation, to print at least a portion of a rectangle onto the substrate 302. In examples where the fluidic die 300 forms part of a printbar, the printbar may be instructed to print the rectangle, and each fluidic die of the printbar therefore is instructed to print a portion of the rectangle. Herein, by 'rectangle' is meant a shape having four sides and four corners and four angles which all measure substantially 90 degrees, or having two pairs of sides each side parallel to the other in the pair, with the sides of one pair being perpendicular to the sides of the other pair. In another sense, a rectangle is a parallelogram whose four angles are all 90 degrees. A rectangle may comprise a square.

In the FIG. 3*a* example, because the die 300 is correctly positioned relative to the substrate 302, the printed image 303 of the rectangle onto the substrate is itself a rectangle. In other words, the printed image 303 comprise a geometrical shape having four sides, four corners and four angles which all measure substantially 90 degrees. In this example, the four sides are labelled a, b, c, and d in FIG. 3*a*, and a first pair of opposing sides a and c are parallel to one another, and a second pair of opposing sides b and d are parallel to one another, with sides a and c being perpendicular to sides b and d. In this way, because the die 300 is correctly positioned with respect to the substrate, the printed image of a rectangle 303 onto the substrate 302 is substantially equal to the rectangle that was intended.

Figure 3B:
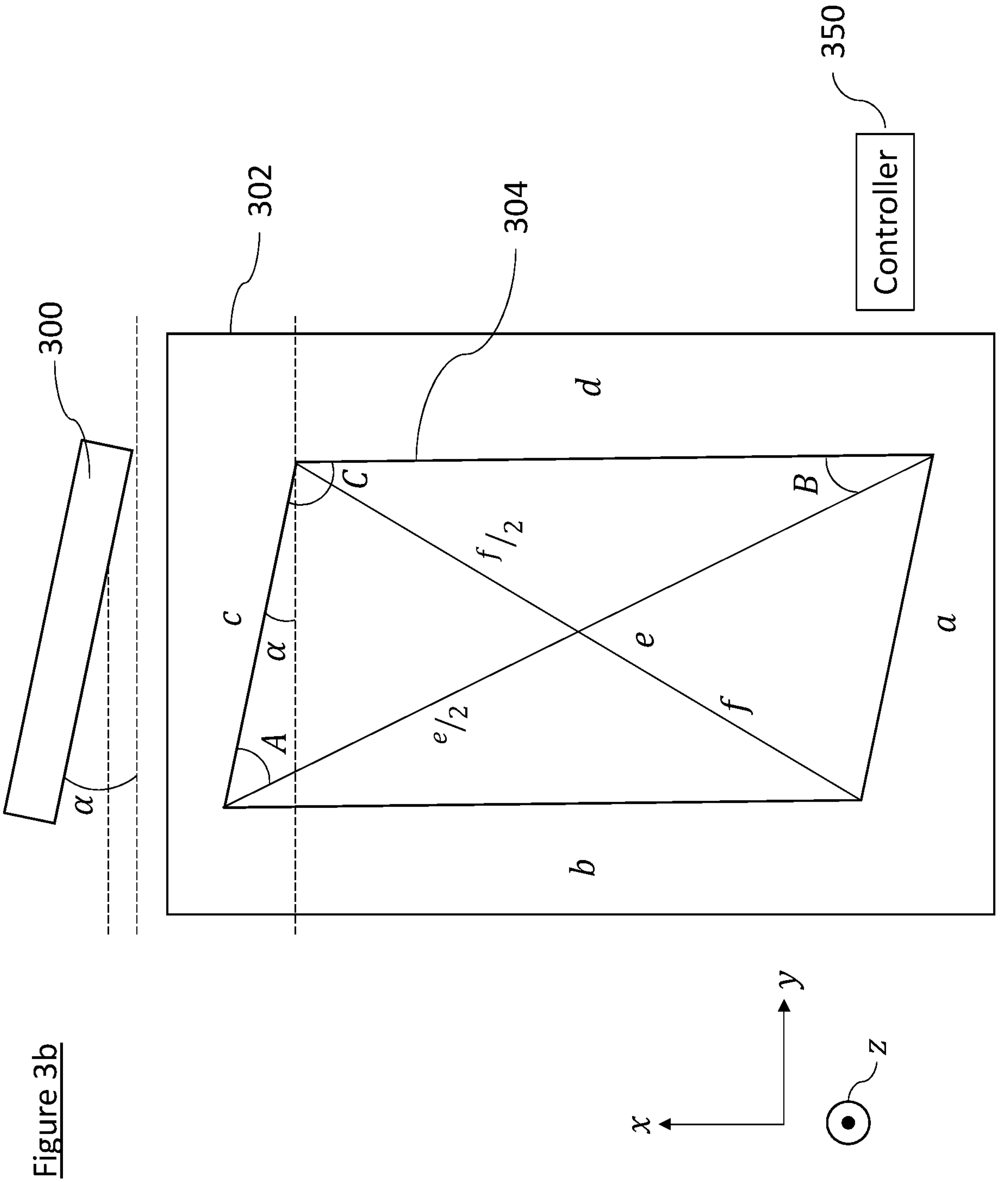

FIG. 3*b* shows the example of FIG. 3*a* but where the fluidic die 300 is incorrectly positioned relative to the substrate 302, in that the die 300 is angled with respect to the substrate 302. In this example, the die 300 is positioned such that it makes a non-zero, or non-180 degree, angle with the direction Y. In this example, the die makes an acute angle α with the direction Y. The die also makes a non-90 degree, acute, angle with the direction X but this angle is not labelled in FIG. 3*b*.

In the FIG. 3*b* example, due to the angle α that the die 300 makes with the substrate 302, although the die is instructed to print at least part of a rectangle, the printed image 304 is a parallelogram whose angles are not right-angles (e.g. not a rectangle). The printed parallelogram comprises opposing sides a and c that are each disposed at the same angle α to the direction Y than the die 300. The parallelogram comprises opposing sides b and d that are both substantially parallel to the direction X (and substantially parallel to the side b and d in the printed rectangle of FIG. 3*a*). The parallelogram comprises four angles none of which are 90 degrees and two bisecting diagonal lines which are labelled e and f. Each angle of the parallelogram may be substantially less than 90 degrees.

With reference again to the method 100 of FIG. 1, at block 102 the first quantity may comprise a quantity proportional to d (or b, since they are equal) (e.g. their value/length), for example 2d or d/2 etc., or, in another example, a quantity may be substantially equal to d (or b). At block 104, the second and third quantities may respectively comprise quantities proportional to e and f (e.g. their values/lengths), for example e/2, f/2, 2e, 2f, etc., or, in another example, the quantities may be substantially equal to e and f.

At block 106, the method 100 comprises using three quantities, each proportional respectively d, e and f, to calculate an angle that the die 300 makes with the print media 302. In one example, block 106 may comprise calculating, by a processor, the angle α. In another example, block 106 may comprise calculating, by a processor, an angle that is proportional to a. In one example, the first quantity comprises d, the second quantity comprises e, the third quantity comprises f, and block 106 comprises calculating, by a processor, the angle α. In another example, the first quantity comprises d, the second quantity comprises e/2, the third quantity comprises f/2, and block 106 comprises calculating, by a processor, the angle α.

In one example, block 106 may comprise calculating, by a processor, the angle α, using, or according to, the following formula:

$$\alpha = \frac{\pi}{2} - A - B$$

With reference again to FIG. 3*b*, the quantities A and B may be derived using the cosine rule of angles according to the following formulas:

$$A = \cos^{-1}\left(\frac{c^2 + \left(\frac{e}{2}\right)^2 - \left(\frac{f}{2}\right)^2}{ce}\right)$$

-continued $$B = \cos^{-1}\left(\frac{d^2 + e^2 - c^2}{2ed}\right)$$

with d being calculated according to the formula:

$$d = \sqrt{c^2 + e^2 - 2ce\cos A}.$$

Of course, in other examples block 106 may comprise calculating an angle different to a (e.g. 2α or α/2, etc.) but still using, at least in part, the formulas above.

It will be appreciated that the bisecting lines and angles e, f, A, C and B still exist for the rectangle of FIG. 3*a* (having different values) but these quantities are not labelled in FIG. 3*a*, and the method 100 may be performed even though the die 300 is not angled with respect to the substrate 302 (e.g. shown in FIG. 3*a*). Then, when the method 100 is applied where the parallelogram is a rectangle as in the FIG. 3*a* example, the angle C would be substantially equal to 90 degrees, with the angles A and B being each substantially equal to 45 degrees, and the angle α in this example would have a value substantially equal to 0 or 180 degrees, etc.

In one example, operating, at block 102 and/or 104 may comprise receiving the first, second, and third quantities. In this example, the quantities may be received, e.g. following manual entry by an operator who has measured the quantities, or the quantities may be received, e.g. automatically, by a processor. In the latter example, block 102 and/or 104 may comprise receiving, by a processor, the first, second, and third quantities. In another example, operating on the first, second, and/or third quantities may comprise calculating and/or measuring the first, second, and/or third quantities. In these examples, block 102 and/or 104 may comprise calculating, e.g. by a processor, scanner or measuring device, the first, second and/or third quantities, for example a scanner or measuring device may be able to determine the quantities by scanning or measuring the substrate 302 with the printed image 303, 304 thereon. In another example, the quantities may be determined, by a processor, from an image of the printed image on the substrate.

Figure 2:
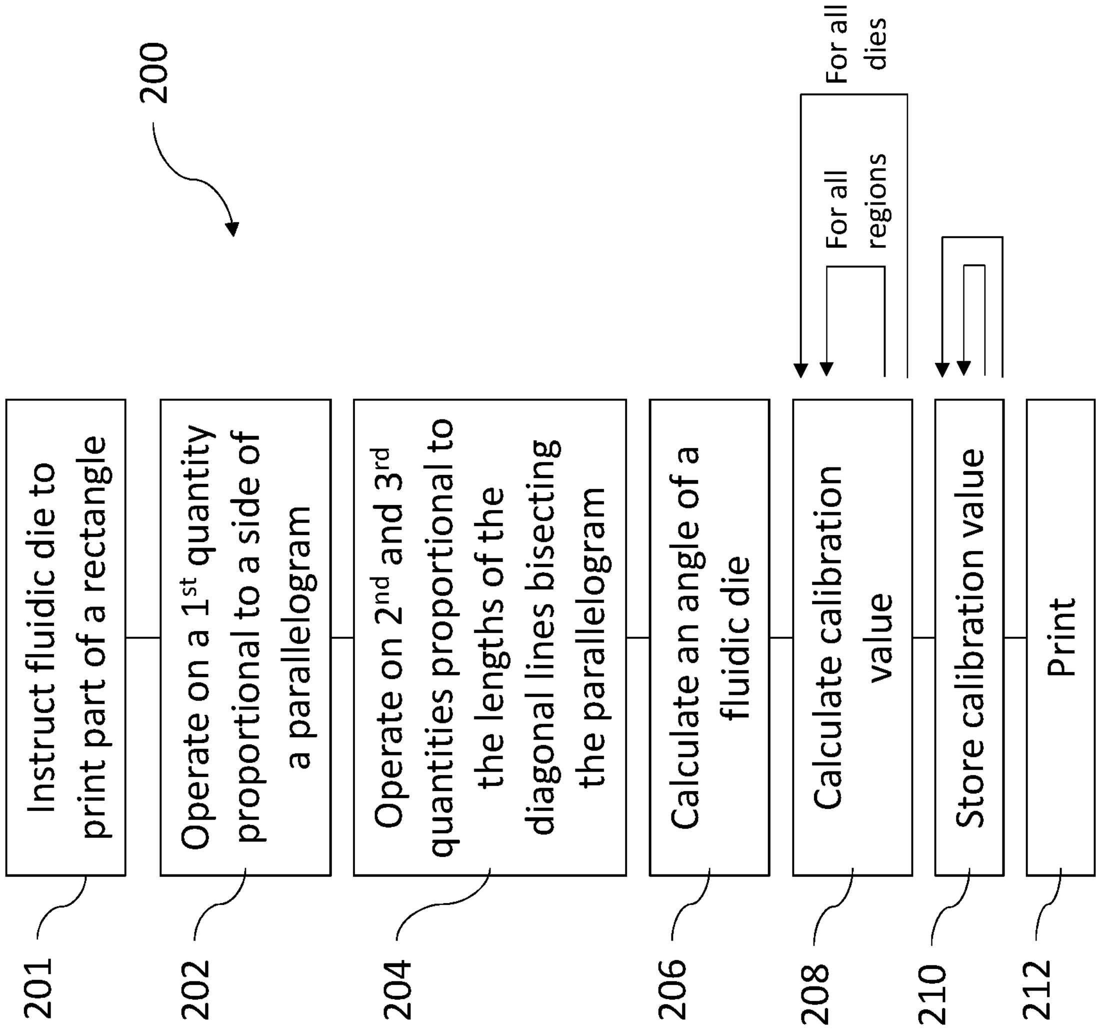
FIG. 2 is a flowchart of an example of a method.

FIG. 2 shows an example method 200, which may comprise a computer-implemented method. The method 200 may comprise a method of calculating an angle of a fluidic die. For example, the method 200 may comprise a method of calculating the angle that a fluidic die makes with a print media (for example, relative or with respect to a direction of advancement of the substrate. The method 200 may comprise a method of calibrating a firing time of a nozzle. The method 200 may comprise the method 100 as described above with reference to FIG. 1.

The method 200 comprises, at block 201, instructing, by a processor, a fluidic die to print at least part of a rectangle onto a print media. If the fluidic die is not at an angle (e.g. is at an angle of 0 or 180 degrees) with respect to the direction Y (as described above with reference to FIGS. 3*a* and 3*b*) then the fluidic die will print (at least in part) image 303. In other words, if the fluidic die is at an angle of 0 or 180 degrees with respect to the direction Y then the image 303 that it prints (at least in part) will be substantially a rectangle 303, as instructed. On the other hand, if the fluidic die is at an angle α with respect to the direction Y, then the die will print (at least in part) image 304. In other words, even though the die is instructed to print a rectangle, if the die is angled with respect to the print media, then the die will print a parallelogram 304 (whose angles are not 90 degrees, as described above).

The method 200 comprises, at block 202, operating, by a processor, on a first quantity. The first quantity is proportional to a side of a parallelogram that is printed, at least in part, on a print media by a fluidic die, the side of the parallelogram (that the first quantity is proportional to) is substantially perpendicular to the direction of advancement of the print media. Block 202 may comprise block 102 as described above with respect to the method 100.

The method 200 comprises, at block 204, operating, by a processor, on a second quantity and on a third quantity. The second and third quantities are respectively proportional to the lengths of the diagonal lines that bisect the parallelogram. Block 204 may comprise block 104 as described above with respect to the method 100.

The method 200 comprises, at block 206, calculating, by a processor, the angle of the fluidic die relative to the print media based on the first, second, and third quantities. Block 206 may comprise block 206 as described above with respect to the method 100.

The method 200 uses the calculated angle (at block 206) to correct the firing time of a nozzle of the fluidic die (e.g. the die 300 as described above with respect to FIGS. 3*a* and 3*b*) so that, even though the die may be angled with respect to the print media, the angle may be compensated for by correcting the firing rate of the nozzles of the die. Accordingly, the method 200 comprises, at block 208, calculating, by a processor, a calibration value for the fluidic die based on the calculated angle, the calibration value being a value used to determine a firing time for a nozzle of the die.

In one example, block 206 may comprise calculating the angle α as described above. In these examples, block 206 may comprise calculating, by a processor, a calibration value for the die based on a using the formula:

$$y=x \tan \alpha.$$

Figure 3C:
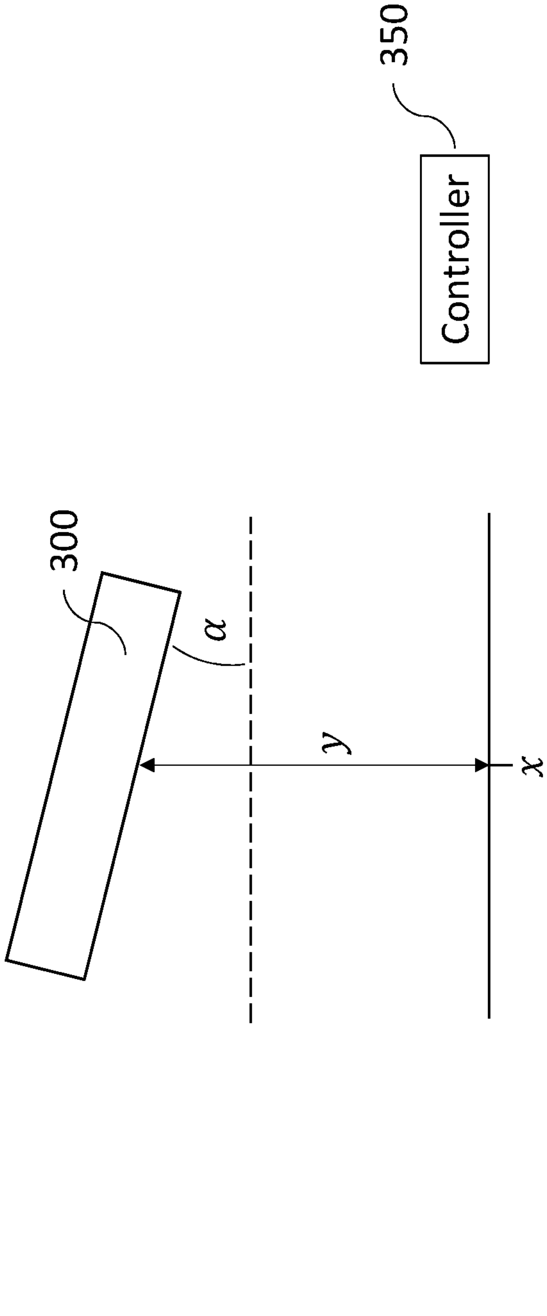

FIG. 3*c* shows a die 300, which may comprise the die shown in FIG. 3*a* or 3*b* (in other words, the die 300 of FIG. 3*c* may be angled with respect to a direction of the substrate 302. FIG. 3*c* shows how the calibration value y as given above may be calculated. In this example, x is the distance from a nozzle of the die and the substrate or print media 302. For example, x may comprise the average distance from each nozzle of the die to the substrate, or the least distance or the most distance etc.

Figure 4A:
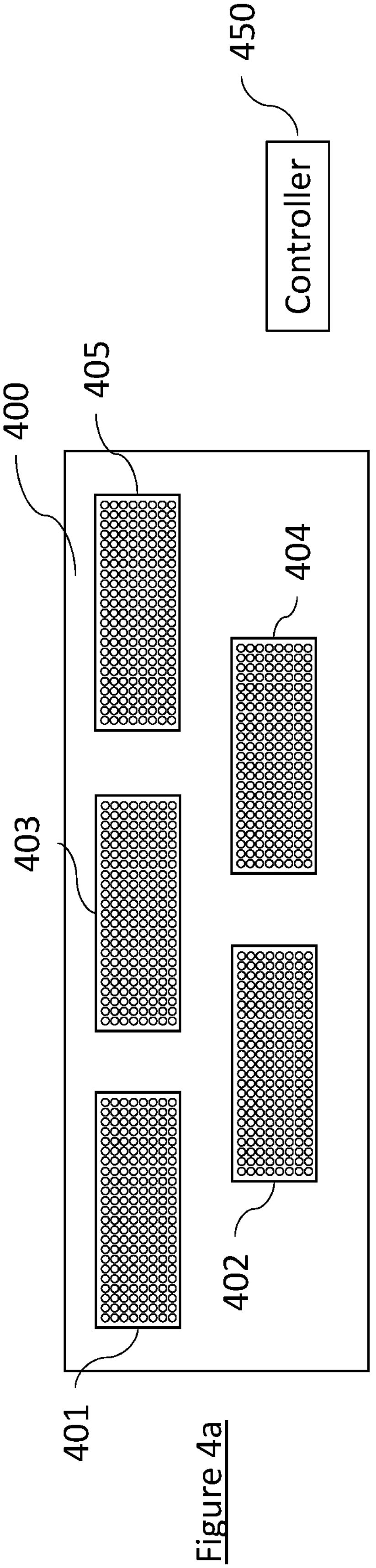
FIG. 4*a* is a schematic example of a printhead.
Figure 4B:
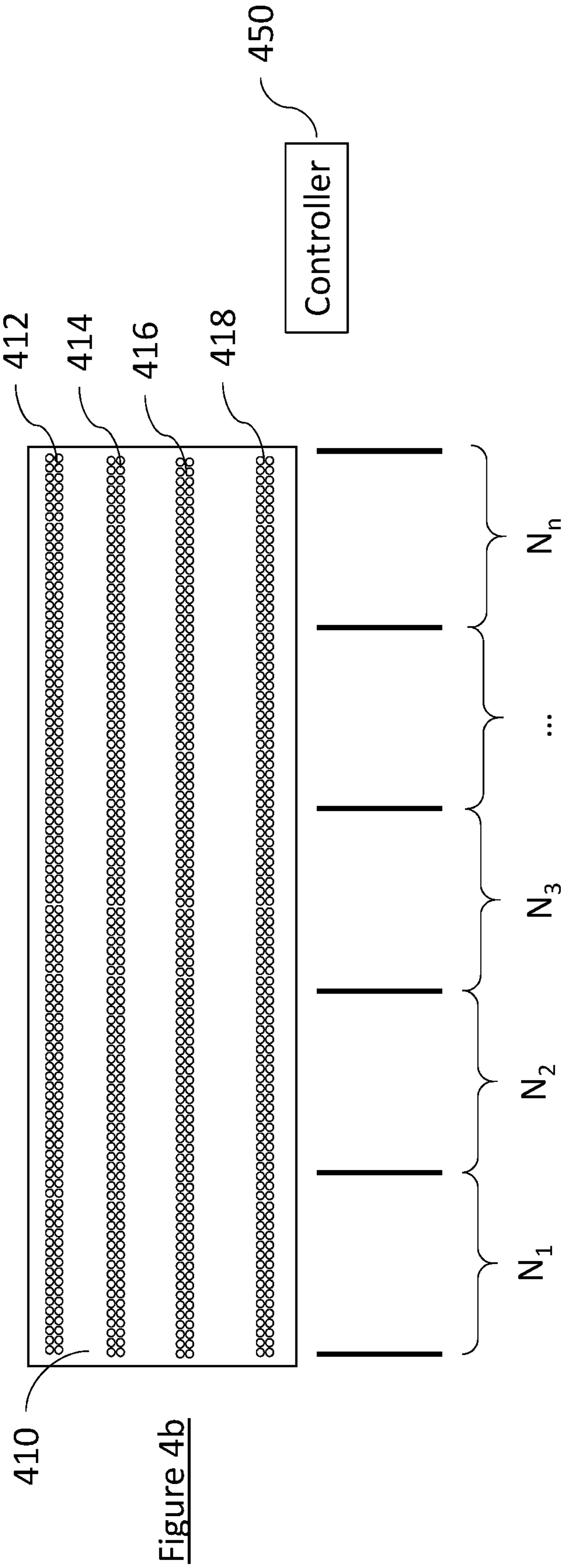
FIG. 4*b* is a schematic example of a fluidic die.
Figure 4C:
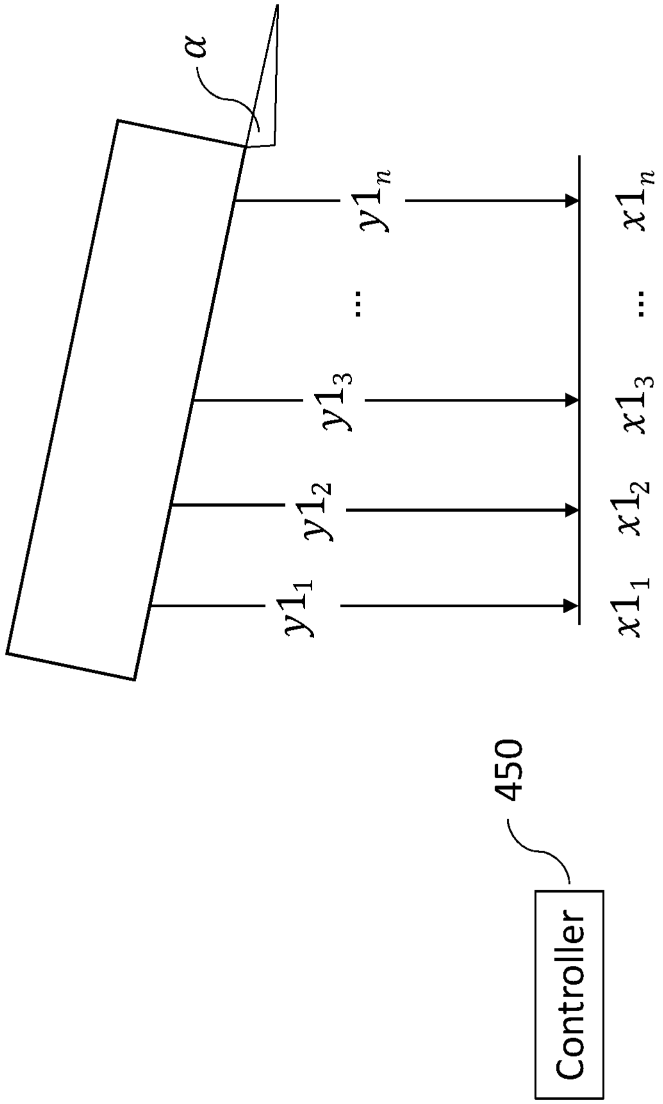
FIG. 4*c* is a schematic example of a fluidic die and substrate.

Referring now to FIGS. 4*a-c* a printhead 400 is shown in FIG. 4*a*. The printhead 400 may comprise the die 300 as described above with reference to FIGS. 3*a* and 3*b*. The printhead 400 may comprise a printbar. The printhead 400 in this example comprises five dies, 401-405, each being disposed in a staggered arrangement in the printhead 400 such that there is overlap between adjacent dies. Of course, in other examples, the printhead 400 may comprise any number of dies. A printbar (not shown) may comprise a number of printheads and therefore may comprise a number of dies. The die 300 as described above may comprise a printbar or printhead, for example the printhead 400. As shown in FIG. 4*a*, each die comprises a number of nozzles, e.g. rows of nozzles or nozzle arrays). FIG. 4*b* shows an example die 410 which may comprise the die 300 or any of the dies 401-405. The example die 410 of FIG. 4*b* comprises four nozzle arrays, or rows of nozzles, 412, 414, 416, 418. In one example, each nozzle array 412-408 may be to discharge one of black, cyan, yellow, or magenta printing fluid, respectively. In examples where the fluidic die 300 comprises the printhead 400, each die 401-405 will have printed part of the rectangle 303 or parallelogram 304 (depending on the angle that the printbar and/or die makes with the substrate 302), with the entire image bin some examples being printed by a printbar comprising the printhead 400. In one example, a printbar comprises eight printheads and each printhead comprises six dies, such that the printbar comprises forty-eight dies. In one example, each die may comprise four nozzle arrays, each array having two rows of nozzles, and each row having 1056 nozzles.

FIG. 4*b* shows the example die 410 being divided into k regions, labelled N1-Nk. A given region may be denoted Nn, the nth region, with 1<n<k. As shown by FIG. 4*c*, a calibration value $y_i$ may be calculated for any given region $N_n$ (or nth region) of any die. FIGS. 4*b* and 4*c* show that, for each, or any given, region of any fluidic die, a calibration value may be calculated. For example, if the rectangle 303 or parallelogram 304 is printed, at least in part, by a number of fluidic dies, the or each fluidic die comprising a plurality of regions of nozzles, a calibration value for a region may be calculated based on the calculated angle α, the calibration value being a value used to determine a firing time for a nozzle in the region (e.g. all nozzles in the region), and the calibration value $y_{in}$, being the calibration value for the nth region of the ith fluidic die in a printbar, may be calculated according to the formula:

$$y_{in}=x_{in} \tan \alpha$$

where $y_{in}$ denotes the value for the nth region of the ith fluidic die and $x_{in}$ represents the distance between a nozzle in the nth region of the ith fluidic die and the print media. In some examples, a or each die may be divided into 5 regions but, in other examples, a or each die may be divided into other than 5 regions. In one examples, a or each die may be divided into 100 regions. In some examples, a or each die may be divided into a number of regions that is between 5 and 100.

With reference again to FIG. 2, as indicated by the looping arrows, block 208, which comprises calculating, by a processor, a calibration value, may be performed for each region of each fluidic die that printed the image, at least in part. For example, block 208 may be performed for all dies in a printhead or printbar. Block 208 of the method 200 may comprise calculating a calibration value for each region of each die using the formula for $y_{in}$ given above.

At block 210 the method 200 comprises storing, by a processor, the (or each) calibration value. As indicated by the looping arrows, block 210 may be performed additionally (e.g. for each region and for each die) depending on the number of values calculated at block 208. Block 210 may comprise storing the or each calibration value calculated at block 208, as described above. In some examples, block 210 may comprise storing a value that is based on the calibration value (calculated at block 208) but is not equal to the calibration value, for example block 210 may comprise storing a value that is proportional to the calibration value, etc.

At block 212, the method 200 comprises printing an image (e.g. a subsequent image) to a substrate or print media. For example, block 212 may comprise instructing, by a processor, a nozzle of a fluidic die according to a firing time that is proportional to the calibration value y, calculated at block 208. Block 212 may comprise instructing, by a processor, all nozzles of a region of a fluidic die according to a firing time proportional to the calibration value y calculated for that region of that die, and this may be performed for all regions of all dies (e.g. in a printhead or printbar). Block 212 may comprise instructing, by processor, all nozzles of a region n of a fluidic die i to fire according to a firing time proportional to the calibration value $y_{in}$. Block 212 may comprise adjusting, by a processor, a firing time of a or each nozzle.

In one example, storing, at block 210, may comprise writing, by a processor, the calculated calibration value to a database (for example, in a look-up table stored in a database). Storing, at block 210, may comprise storing, by a processor, the calculated calibration value in an alignment file. In these examples, the alignment file may comprise a distance value (which may be termed a "down-web" value) for a nozzle of the fluidic die. For example, a distance value may be stored for a nozzle, or a set or nozzles, or an array of nozzles in the die. A distance value may be stored for the die itself or may be stored for each region of the die. In some examples, a database (e.g. lookup table or alignment file) may already comprise distance values for a number of nozzles, which may be used to calibrate the firing times of those nozzles assuming a straight (e.g. not-angled) alignment of the die or print bar, as depicted in FIG. 3*a*. In these examples, block 210 may comprise overwriting, by a processor, a stored calibration value with the (new) calibration value calculated at block 210 of the method 200. In some examples, one calibration value may be stored per die and block 210, may comprising storing one calibration value per region of the die. In other words, in these examples, where a die has been divided into regions, block 210 may comprise storing a calibration value $y_n$ for each of the regions, and this may be performed for each die, as indicated by the looping arrows in FIG. 2 for block 210.

Block 210 may comprise re-calibrating the firing times of a nozzle of a fluidic die based on the calculated angle. Storing the new value y (or $y_{in}$ for each region of each die) may enable the angle that the die or printbar makes with the substrate (no matter what that angle is) to be compensated for. In this way, despite the die or printbar being angled, if the die is instructed to print a rectangle 303 (e.g. if block 201 were to be performed subsequently), the printed image will comprise the rectangle 303 since the angle has been compensated for by adjusting the firing time of a nozzle of the die or printbar. In some examples, the firing time described herein may comprise a firing delay in that the calibrated value may be used to delay the firing time of a or each nozzle.

To calibrate the firing times of each nozzle, once the value y (or $y_{in}$ for each region of each die) is known, printing, at block 212, may comprising calculating, by a processor, the firing time for the or each nozzle or region of nozzles etc. based on the calibration value calculated at block 210. For example, where a printbar comprises i fluidic dies and each die has been divided into regions then the firing time of each of the nozzles in each region of each die may be calculated based on the value $y_{in}$. As stated above, the calibration value $y_{in}$ may be stored for each region of each die. In these examples, block 212 of the method may comprise retrieving, by a processor, a stored calibration value, for example retrieving or fetching a stored calibration value for each die. Block 212 of the method may therefore comprise accessing, by a processor, a lookup table and retrieving a stored entry in the lookup table for a given region of a given die. The stored calibration value may be equal to $y_{in}$ for each region of each die, or may be proportional to $y_{in}$ for each region of each die. As shown in FIGS. 3*a*-4*c*, in some examples there is provided a controller 350, 450, which will now be described.

Figure 5:
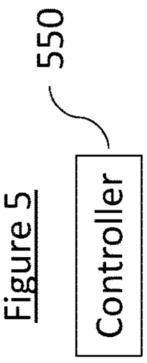
FIG. 5 is a schematic example of a controller.

FIG. 5 shows an example controller 550 which may comprise the controller 350 shown in FIGS. 3*a*-3*c* or the controller 450 as shown in FIGS. 4*a*-4*c*. The controller 550 may be to perform the method 100 or the method 200 (e.g. any of the blocks thereof).

The controller 550 is a controller for a print apparatus (not shown). The print apparatus comprises a fluidic die to print at least part of an image onto a print media or substrate. The print apparatus may comprise a printhead comprising a number of fluidic die. The print apparatus may comprise a printbar comprising a number of printheads. The controller 550 may be part of a wider system, for example may be part of the print apparatus.

The controller 550 is to operate on first, second and third values. The first value corresponds to the length of a side of a parallelogram printed, at least in part, by a fluidic die onto a print media, the side of the parallelogram being substantially perpendicular to the direction of advancement of the print media. The second and third values, respectively, correspond to of the lengths of the diagonal lines bisecting the parallelogram. The controller 550 may be to receive the first, second, and third values in some examples (e.g. manually, by a user-input, or automatically). In other examples, however, the controller 550 may be to calculate the first, second and third values. In these examples, the controller 550 may comprise a measuring device or sensor.

As described above with reference to FIGS. 3*a* and 3*b*, the controller 550, by operating on the first, second, and third values is able to determine whether an image printed to the print media is a rectangle or not. For example, the fluidic die may have been instructed to print a rectangle onto a print media but, if the die is angled with respect to the media, as described above, then the resulting image may comprise the parallelogram 304, e.g. not a rectangle. The controller 550 is to calculate an angle of the fluidic die relative to the print media based on the first, second, and third values.

The controller 550 may operate on the values d (or b), e, and f as described above, these values respectively comprising the first, second, and third values, or, in other examples, the controller 550 may be to operate on values that are proportional to these values (e.g. 2d, e/2, f/2, etc.). In one example, the controller 550 is to calculate the angle $\alpha$ as described above. However, in other examples, the controller 550 may be to calculate an angle that is proportional to a, for example $2\alpha$, $\alpha/2$, etc.

The controller 550 may be to calculate a calibration value for the fluidic die based on the calculated angle. The controller 550 may be to use the calibration value to determine a firing time for a nozzle in the fluidic die. The controller 550 may be to calculate a firing time for that nozzle and may also be to cause the nozzle to fire at a time proportional to the calibration value y. For example, where the calculated angle is $\alpha$, the calibration value y for a nozzle may be calculated using the formula:

$$y=x \tan \alpha$$

as described above. The controller 550 may be to store the calibration value y, e.g. in a lookup table and/or a database (for example, of the print apparatus). The controller 550 may be to retrieve the stored value y to calculate a firing time of a nozzle based on the calibration value y.

The controller 550 may further be to divide each fluidic die into regions. In these examples, the controller 550 may be to calculate the calibration value y for each of a plurality of regions of the fluidic die. For example, where i fluidic dies are divided into regions then controller 550 may be to calculate a calibration value $y_{in}$ for the nth region of the ith fluidic die in a printbar, for example for each region of each fluidic die. In some examples, the controller 550 may be to calculate $y_{in}$ according to the formula:

$$y_{in}=x_{in}\tan\alpha$$

where $y_{in}$ denotes the value for the nth region of the ith fluidic die and $x_{in}$ represents the distance between a nozzle in the nth region of the ith fluidic die and the print media. The controller 550 may be to use the calibration value to determine a firing time for each nozzle in each fluidic die. The controller 550 may be to calculate a firing time for each nozzle and may also be to cause each nozzle to fire at a time proportional to the calibration value $y_{in}$.

The controller 550 may be to store each calibration value $y_{in}$, e.g. in a lookup table and/or a database (for example, of the print apparatus). The controller 550 may be to retrieve each stored value $y_{in}$ to calculate a firing time of for each nozzle in each region of each die based on the calibration value $y_{in}$ for the nozzles in each region of each die.

Figure 6:
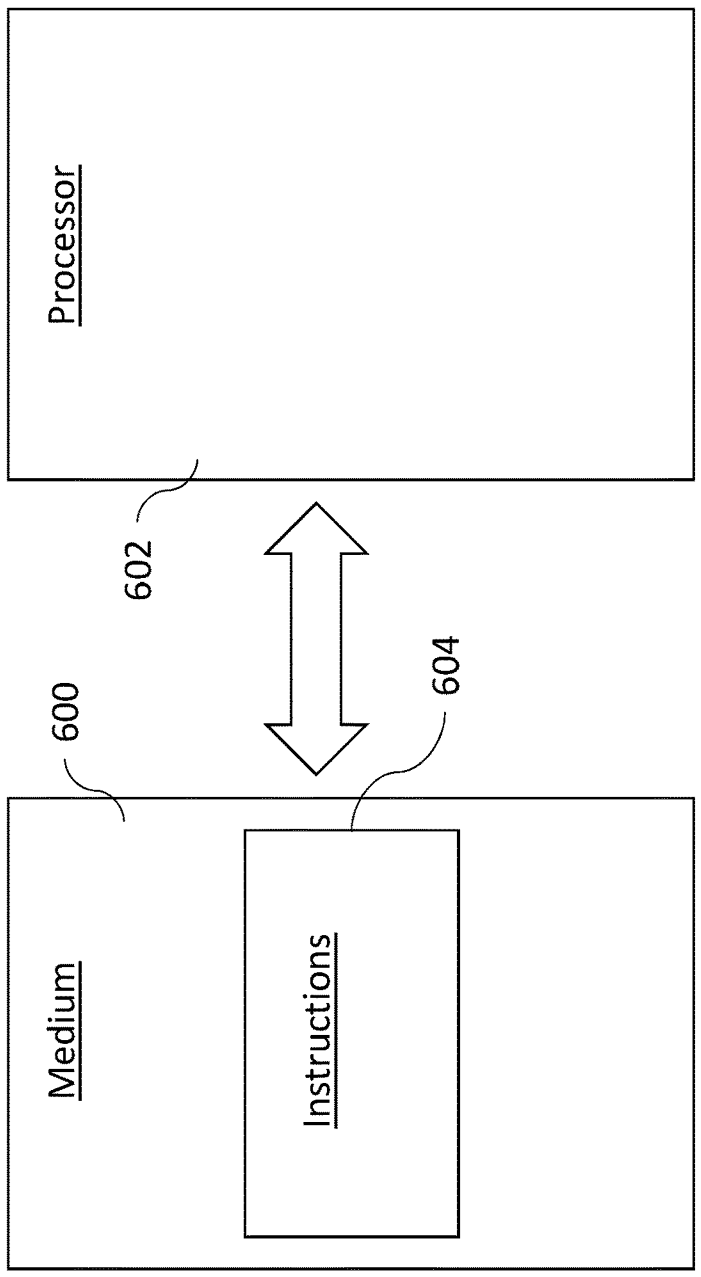
FIG. 6 is a schematic example of a machine-readable medium in association with a processor.

FIG. 6 shows an example non-transitory machine-readable medium, or computer-readable medium, 600, comprising a set of instructions 604 stored thereon. The medium 600 is shown in FIG. 6 in association with a processor 602. The controller 350, 450, 550 as described above may, in some examples, comprise the medium 600 and/or the processor 602. The instructions 604, when executed by the processor 602, may cause the processor 602 to perform the method 100 or 200 (e.g. any of the blocks thereof) as described above with respect to FIGS. 1 and 2. The instructions, 604, when executed by the processor 602, are to cause the processor 602 to calculate an angle of a fluidic die of a print apparatus relative to a print media through the print apparatus based on a first length that is correlated to the length of a side of a parallelogram that was printed, at least in part, by the fluidic die onto the print media, the side of the parallelogram being substantially perpendicular to the direction of movement of the print media, and second and third lengths that are, respectively, correlated to the lengths of the diagonal lines bisecting the parallelogram.

The instructions 604 may be to cause the processor 602 to calculate, or receive, the first, second and third values, or a value that is proportional to the first, second and third values. The first, second and third values may respectively be proportional, or equal to, the values d (or b), e, and f, as described above. The instructions 604 may be to cause the processor 602 to calculate the angle $\alpha$, as described above, or an angle that is proportional to $\alpha$.

The instructions 604, when executed by the processor 602, may be to cause the processor 602 to calculate a calibration value for the fluidic die. Where the angle is a, the instructions 604 may be to cause the processor 602 to calculate the calibration value according to the formula $y=x\tan\alpha$, as described above. The instructions 604 may be to cause the processor 602 to calculate a firing time for a nozzle based on the calibration y, and, in some examples, also to store the calibration value y. The instructions 604 may be to cause the processor 602 to retrieve or fetch the stored calibration value to calculate the firing time (e.g. from a lookup table) as described above. As also described above with reference to FIGS. 4*a-c*, the instructions 604 may be to cause the processor 602 to divide the or each fluidic die into regions and to calculate a calibration value for each region of each die, and to calculate a firing time for the nozzles in each region of each die. For example, the instructions 604 may be to cause the processor 602 to calculate the value $y_{in}$, as described above, being a calibration value for the nth region of the ith die.

The instructions 604 may be to cause the processor 602 to cause a fluidic die (e.g. of a printhead or printbar) to print at least part of a rectangle, with the first, second, and third values being derived from the printed parallelogram which are then used to determine whether the die is angled with respect to the print media.

The examples described herein allow for an angle between a fluidic die and a substrate to be determined and compensated for by calibrating a firing time, or firing delay, of a nozzle of the die according to the angle that it makes with the substrate, whatever that angle is. For example, if the die remains at an acceptable angle then no calibration may be necessary but if the die has been caused to move then the new angle may be compensated for such that an image printed at least in part by the die is as intended. This, in turn, means that the image quality may be improved since die misalignments can be compensated for which will improve, in particular, print jobs where a high degree of accuracy or precision is demanded. Specific problems such as non-matching sides in dual-sided printing may also therefore be addressed by the examples herein.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

operating, by a processor, on a first quantity that is proportional to a side of a parallelogram printed, at least in part, on a substrate by a fluidic die, the side of the parallelogram being substantially perpendicular to the direction of advancement of the substrate;

operating, by a processor, on a second quantity and a third quantity, the second and third quantities respectively being proportional to the length of diagonal lines bisecting the parallelogram; and calculating, by a processor, an angle of the fluidic die relative to the substrate based on the first, second, and third quantities.

2. A method according to claim 1, wherein calculating the angle comprises using the formula:

$$\alpha = \frac{\pi}{2} - A - B$$

where α denotes the angle between the fluidic die and the direction of movement and where A and B are given by:

$$A = \cos^{-1}\left(\frac{c^2 + \left(\frac{e}{2}\right)^2 - \left(\frac{f}{2}\right)^2}{ce}\right)$$

$$B = \cos^{-1}\left(\frac{d^2 + e^2 - c^2}{2ed}\right)$$

where d is given by:

$$d = \sqrt{c^2 + e^2 - 2ce\cos A}$$

and where c denotes the length of the side of the parallelogram and where e and f respectively denote the lengths of the bisecting lines.

3. A method according to claim 2, further comprising:

calculating, by a processor, a calibration value for the fluidic die based on the calculated angle α, the calibration value being a value used to determine a firing time for a nozzle in the fluidic die, comprising using the formula:

$$y = x \tan \alpha$$

where y denotes the calibration value and x denotes the distance between a nozzle of the fluidic die and the substrate.

4. A method according to claim 2, further comprising:

instructing, by a processor, a nozzle of the fluidic die to fire a droplet of printing fluid according got a firing time that is proportional to the calibration value y.

5. A method according to claim 2, wherein the parallelogram is printed, at least in part, by a number of fluidic dies, the or each fluidic die comprising a plurality of regions of nozzles and wherein the method further comprises, for each region of the or each fluidic die:

calculating, by a processor, a calibration value for the region based on the calculated angle α, the calibration value being a value used to determine a firing time for the nozzles in the region, comprising using the formula:

$$y_{in} = x_{in} \tan \alpha$$

where $y_{in}$ denotes the value for the nth region of the ith fluidic die and $x_{in}$ represents the distance between a nozzle in the nth region of the ith fluidic die and the substrate.

6. A method according to claim 1, further comprising:

calculating, by a processor, a calibration value for the fluidic die based on the calculated angle.

7. A method according to claim 1 further comprising:

instructing, by a processor, the fluidic die to print at least part of a rectangle onto the substrate.

8. A controller for a print apparatus, the controller being to operate on first, second and third values, wherein the first value corresponds to the length of a side of a parallelogram printed, at least in part, by a fluidic die onto a print media, the side of the parallelogram being substantially perpendicular to the direction of advancement of the substrate, and wherein the second and third values, respectively, correspond to of the lengths of the diagonal lines bisecting the parallelogram; and wherein the controller is to calculate an angle of the fluidic die relative to the print media based on the first, second, and third values.

9. A controller according to claim 8, wherein the controller is to calculate the angle according to the formula:

$$\alpha = \frac{\pi}{2} - A - B$$

where α denotes the angle between the fluidic die and the direction of movement and where A and B are given by:

$$A = \cos^{-1}\left(\frac{c^2 + \left(\frac{e}{2}\right)^2 - \left(\frac{f}{2}\right)^2}{ce}\right)$$

$$B = \cos^{-1}\left(\frac{d^2 + e^2 - c^2}{2ed}\right)$$

where d is given by:

$$d = \sqrt{c^2 + e^2 - 2ce\cos A}$$

and where c denotes the length of the side of the parallelogram and where e and f respectively denote the lengths of the bisecting lines.

10. A controller according to claim 9, wherein the controller is to calculate a calibration value for the fluidic die based on the calculated angle α, the calibration value being a value used to determine a firing time for a nozzle in the fluidic die using the formula:

$$y=x\tan\alpha$$

where y denotes the calibration value and x denotes the distance between a nozzle of the fluidic die and the print media.

11. A controller according to claim 10 wherein the controller is to cause a nozzle of the fluidic die to fire at a time proportional to the calibration value y.

12. A controller according to claim 9, wherein the controller is to calculate the calibration value y for each of a plurality of regions of the fluidic die, and wherein the controller is further to store each calibration value for each region of the fluidic die.

13. A non-transitory machine-readable medium comprising a set of machine-readable instructions stored thereon which, when executed by a processor, cause the processor to:

calculate an angle of a fluidic die of a print apparatus relative to a print media through the print apparatus based on:

a first length that is correlated to the length of a side of a parallelogram that was printed, at least in part, by the fluidic die onto the print media, the side of the parallelogram being substantially perpendicular to the direction of movement of the print media, and second and third lengths that are, respectively, correlated to the lengths of the diagonal lines bisecting the parallelogram.

14. A non-transitory machine-readable medium according to claim 13 wherein the instructions, when executed by the processor, cause the processor to calculate the angle according to the formula:

$$\alpha = \frac{\pi}{2} - A - B$$

where a denotes the angle between the fluidic die and the direction of movement and where A and B are given by:

$$A = \cos^{-1}\left(\frac{c^2 + \left(\frac{e}{2}\right)^2 - \left(\frac{f}{2}\right)^2}{ce}\right)$$

$$B = \cos^{-1}\left(\frac{d^2 + e^2 - c^2}{2ed}\right)$$

where d is given by:

$$d=\sqrt{c^2+e^2-2ce\cos A}$$

and where c denotes the length of the side of the parallelogram and where e and f respectively denote the lengths of the bisecting lines.

15. A non-transitory machine-readable medium according to claim 14 wherein the instructions, when executed by the processor, cause the processor to calculate a calibration value for the fluidic die according to the formula:

$$y=x\tan\alpha$$

where y denotes the calibration value and x denotes the distance between a nozzle of the fluidic die and the print media.

* * * * *